United States Patent
Deisinger et al.

(10) Patent No.: US 8,861,538 B2
(45) Date of Patent: Oct. 14, 2014

(54) THROTTLING FOR FAST DATA PACKET TRANSFER OPERATIONS

(75) Inventors: Mark V. Deisinger, Shoreview, MN (US); Allyn Smith, Shoreview, MN (US); John A. Peters, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 147 days.

(21) Appl. No.: 13/604,740

(22) Filed: Sep. 6, 2012

(65) Prior Publication Data

US 2014/0064294 A1   Mar. 6, 2014

(51) Int. Cl.
| | | |
|---|---|---|
| *H04L 12/861* | (2013.01) | |
| *G06F 9/00* | (2006.01) | |
| *H04L 12/851* | (2013.01) | |
| *H04L 12/863* | (2013.01) | |
| *H04L 12/801* | (2013.01) | |

(52) U.S. Cl.
CPC ............. *H04L 49/90* (2013.01); *H04L 47/2441* (2013.01); *H04L 47/6285* (2013.01); *H04L 47/12* (2013.01); *H04L 47/19* (2013.01); *G06F 9/00* (2013.01); *H04L 47/10* (2013.01)
USPC ....................................................... 370/412

(58) Field of Classification Search
CPC ....... H04L 49/90; H04L 49/901; H04L 47/10; H04L 4/50; H04L 12/5613; H04Q 11/0478
USPC .......................................... 370/412; 709/230
See application file for complete search history.

(56) References Cited

U.S. PATENT DOCUMENTS

| | | | | |
|---|---|---|---|---|
| 6,810,426 | B2 * | 10/2004 | Mysore et al. | 709/234 |
| 7,150,021 | B1 * | 12/2006 | Vajjhala et al. | 718/104 |
| 7,170,876 | B2 * | 1/2007 | Wei et al. | 370/335 |
| 7,848,309 | B2 * | 12/2010 | Matsukura et al. | 370/351 |
| 8,060,074 | B2 * | 11/2011 | Danford et al. | 455/419 |
| 8,130,737 | B2 * | 3/2012 | Singh et al. | 370/338 |
| 8,289,940 | B2 * | 10/2012 | Singh et al. | 370/338 |
| 8,462,627 | B2 * | 6/2013 | Celinski et al. | 370/235 |
| 2003/0131122 | A1 * | 7/2003 | Kondo et al. | 709/233 |
| 2005/0281268 | A1 * | 12/2005 | Akers et al. | 370/395.1 |
| 2009/0147678 | A1 * | 6/2009 | Xhafa et al. | 370/232 |
| 2014/0086045 | A1 * | 3/2014 | Bao et al. | 370/229 |

* cited by examiner

*Primary Examiner* — Mark Rinehart
*Assistant Examiner* — Peter Solinsky
(74) *Attorney, Agent, or Firm* — Richard J. Gregson

(57) ABSTRACT

A fast send method may be selectively implemented for certain data packets received from an application for transmission through a network interface. When the fast send method is triggered for a data packet, the application requesting transmission of the data packet may be provided a completion notice nearly immediately after the data packet is received. The fast send method may be used for data packets similar to previously-transmitted data packets for which the information in the data packet is already vetted. For example, a data packet with a similar source address, destination address, source port, destination port, application identifier, and/or activity identifier may have already been vetted. Data packets sent through the fast send method may be throttled to prevent one communication stream from blocking out other communication streams. For example, every nth data packet queued for the fast send method may be transmitted by a slow send method.

20 Claims, 12 Drawing Sheets

300

| LOCAL ADDR | LOCAL PORT | REMOTE ADDR | REMOTE PORT | STATUS | |
|---|---|---|---|---|---|
| 10.0.0.5 | 9800 | 10.0.0.6 | 9800 | SLOW_NEXT | ~302 |
| 10.0.0.5 | 9801 | 10.0.0.6 | 9801 | SLOW_IN_PROGRESS | ~304 |
| 10.0.0.5 | 9802 | 10.0.0.6 | 9802 | SLOW_DETACHING | ~306 |
| 10.0.0.5 | 9803 | 10.0.0.6 | 9803 | FAST_NEXT | ~308 |

| LOCAL ADDR | LOCAL PORT | REMOTE ADDR | REMOTE PORT | STATUS | |
|---|---|---|---|---|---|
| 10.0.0.5 | 9800 | 10.0.0.6 | 9800 | SLOW_NEXT | ~302 |
| 10.0.0.5 | 9801 | 10.0.0.6 | 9801 | SLOW_IN_PROGRESS | ~304 |
| 10.0.0.5 | 9802 | 10.0.0.6 | 9802 | SLOW_DETACHING | ~306 |
| 10.0.0.5 | 9803 | 10.0.0.6 | 9803 | FAST_NEXT | ~308 |

THROTTLING FOR FAST DATA PACKET TRANSFER OPERATIONS

FIELD OF THE DISCLOSURE

The instant disclosure relates to computer systems. More specifically, this disclosure relates to network communications.

BACKGROUND

Applications requesting to transmit data through a network interface communicate their requests to an operating system to handle the data transmission. That is, the applications do not handle the data transmissions. Instead, the operating system handles interacting with the computer hardware to perform the data transmission. After the application makes the request to transmit data, the application waits to receive a confirmation that the request to transmit data was received and processed.

A conventional method for processing requests to transmit data from applications is illustrated in the flow chart of FIG. 1. A method 100 includes an application requesting to transmit data using a network interface at block 102. The request may be sent to another application, such as a service, running on the computer system. The other application may handle communications with the network interface. At block 104, the interface queues the data transmission while the application waits for a completion notice. The network interface vets the data transmission request and at block 106, the network interface returns a completion code to the application after vetting the request. At block 108, the application resumes operation after receiving the completion code. The network interface may attempt to transmit the data at some time in the future.

Because the application does not interface with the network interface directly, the application pauses each time a request to transmit data is submitted to the other application. This delay can significantly interrupt the operation of the application. For example, the application may perform server functions on a network, such that the application is frequently transmitting data. In this case, a delay each time that a data transmission request is generated significantly reduces the application's throughput.

SUMMARY

Delay experienced by an application transmitting data packets may be reduced or eliminated by determining which data packets may be queued without vetting the specifics of the data packets. For example, when information regarding the data packet is similar to a previously-transmitted data packet, the data packet may be queued and a completion notice provided to the application nearly immediately after receiving the data packet. Packets queued for transmission without vetting may be transmitted according to a fast send method. Packets queued for transmission after vetting may be transmitted according to a slow send method. Data packets received from an application may be classified for transmission by the fast send method or the slow send method.

Classifying data packets for transmission by a fast send method or a slow send method may be completed with the assistance of a send state table. Data packets may be compared to a send state table of previously-transmitted data packets based on a source address, source port, destination address, destination port, activity identifier, and/or application identifier. The send state table may be continuously updated as new data packets are received for transmission. A status identifier for each entry in the send state table may identify how future data packets matching the entry should be transmitted. A timer mechanism may be used to delete entries in the table that are not matched in a predetermined period of time. Further, entries in the send state table may be removed when an application detaches from execution while transmitting the data packet that resulted in the entry.

Throttling may be used to reduce the number of data packets sent through the fast send method. Because certain repeated transmissions may result in one application being preferentially treated over other applications, a throttling technique may be used to ensure fairness for all applications attempting to queue data packets for transmission. The throttling technique may, for example, override a fast send assignment for every nth data packet matching a fast send entry in the send state table.

According to one embodiment, a method includes receiving a first data packet from an application. The method also includes pausing execution of the application. The method further includes queuing the first data packet for transmission. The method also includes resuming execution of the application when a completion code is received. The method further includes receiving a second data packet from the application. The method also includes queuing the second data packet for transmission without pausing execution of the application.

According to another embodiment, a computer program product includes a non-transitory computer readable medium having code to receive a first data packet from an application. The medium also includes code to pause execution of the application. The medium further includes code to queue the first data packet for transmission. The medium also includes code to resume execution of the application when a completion code is received. The medium further includes code to receive a second data packet the application. The medium also includes code to queue the second data packet for transmission without pausing execution of the application.

According to yet another embodiment, an apparatus includes a memory, a network interface, and a processor coupled to the memory and to the network interface. The processor is configured to receive a first data packet from an application. The processor is also configured to pause execution of the application. The processor is further configured to queue the first data packet for transmission on the network interface. The processor is also configured to resume execution of the application when a completion code is received. The processor is further configured to receive a second data packet from the application. The processor is also configured to queue the second data packet for transmission on the network interface without pausing execution of the application.

According to one embodiment, a method includes receiving, from an application, a first data packet for transmission. The method also includes identifying a fast send method for transmitting the first data packet. The method further includes determining whether to throttle the first data packet. The method also includes transmitting, if the first data packet is throttled, the first data packet with a slow send method.

According to another embodiment, a computer program product includes a non-transitory computer readable medium having code to receive, from an application, a first data packet for transmission. The medium also includes code to identify a fast send method for transmitting the first data packet. The medium further includes code to determine whether to throttle the first data packet. The medium also includes code to transmit, if the first data packet is throttled, the first data packet with a slow send method.

According to yet another embodiment, an apparatus includes a memory, a network interface, and a processor coupled to the memory and to the network interface. The processor is configured to receive, from an application, a first data packet for transmission. The processor is also configured to identify a fast send method for transmitting the first data packet. The processor is further configured to determine whether to throttle the first data packet. The processor is also configured to transmit, if the first data packet is throttled, the first data packet with a slow send method.

According to a further embodiment, a method includes receiving, from an application, a first data packet for transmission. The method also includes identifying a similar packet in a send state table. The method also includes determining from the send state table, a transmission method for the first data packet.

According to another embodiment, a computer program product includes a non-transitory computer readable medium having code to receive, from an application, a first data packet for transmission. The medium also includes code to identify a similar packet in a send state table. The medium further includes code to determine from the send state table, a transmission method for the first data packet.

According to yet another embodiment, an apparatus includes a memory, a network interface, and a processor coupled to the memory and to the network interface. The processor is configured to receive, from an application, a first data packet for transmission. The processor is also configured to identify a similar packet in a send state table. The processor is further configured to determine from the send state table, a transmission method for the first data packet.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIG. 3 is a table illustrating a send state table according to one embodiment of the disclosure.

DETAILED DESCRIPTION

Delay experienced by an application may be reduced by allowing certain requests for data transmission from the application to be quickly acknowledged. When the request is quickly acknowledged, the application may return to processing data or other tasks, which improves performance and throughput. According to one embodiment, the request for transmission may be examined and, when the transmission is similar to a previous transmission known to be successful, acknowledged quickly. For example, the data transmission request may be examined and compared to entries in a table to determine if a similar data transmission request was previously vetted. In the event a similar entry in the table is found, then a completion code may be quickly provided to the application to reduce the delay time experienced by the application. The network interface may determine that when a new data transmission request is similar to a previously-vetted data transmission request, the new data transmission request may be subject to reduced vetting or no vetting.

Figure 1:
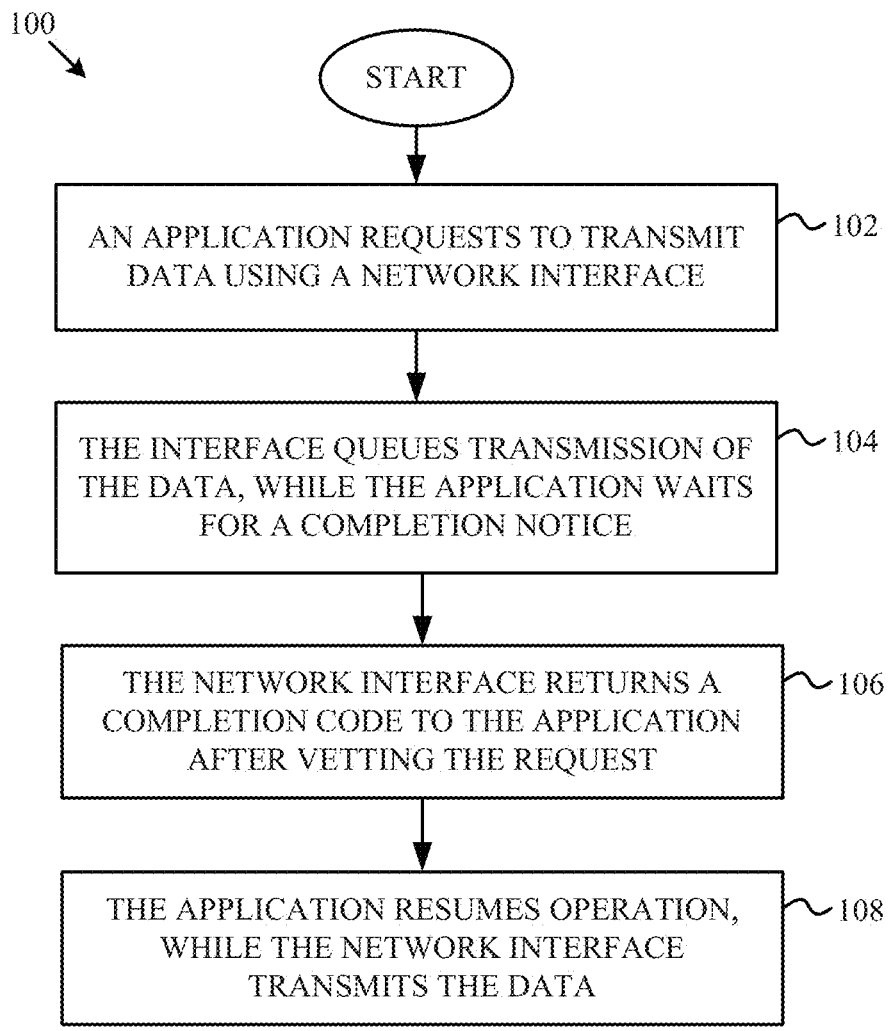
FIG. 1 is a flow chart illustrating a conventional method for requesting transmission of data through a network interface.
Figure 2:
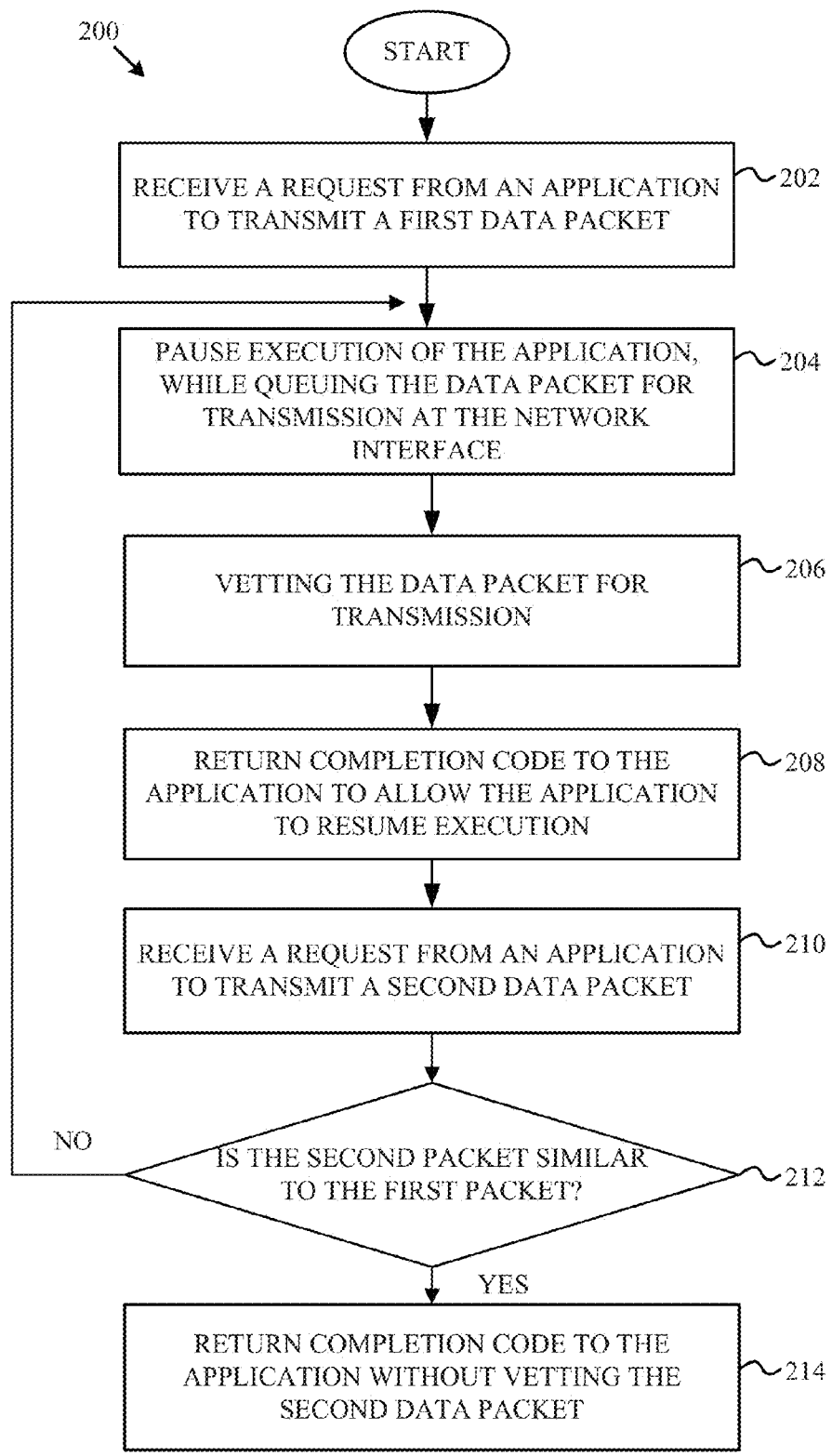
FIG. 2 is a flow chart illustrating an exemplary method for requesting transmission of data through a network interface according to one embodiment of the disclosure.

FIG. 2 is a flow chart illustrating an exemplary method for requesting transmission of data through a network interface according to one embodiment of the disclosure. A method 200 begins at block 202 with receiving a request from an application, such as a transport services user (TSU), to transmit a first data packet. At block 204, execution of the application is paused while the first data packet is queued at the network interface. At block 206, the first data packet is vetted for transmission, and at block 208, a completion code is returned to the application to allow the application to resume execution after the data packet is vetted.

At block 210, a request from the application to transmit a second data packet is received. At block 212, the second data packet is determined to be similar or not similar to the first data packet. If the second data packet is not similar to the first data packet, the method 200 returns to block 204 to transmit the data packet according to a slow transmission method, which includes pausing execution of the application. If the second data packet is similar to the first data packet, the method 200 continues to block 214 at which a completion code is returned to the application without vetting the second data packet. The fast method of transmission at block 214 allows the application to quickly resume execution after making a request to transmit the second data packet.

According to one embodiment, the data packets received for transmission are formatted according to a user datagram protocol (UDP). UDP transmissions may be considered unreliable, because UDP datagrams may arrive out of order, may appear duplicated, or may go missing without notice. Thus, UDP transmissions may have little or no error checking at the protocol level. The vetting procedures of block 206 may be less relevant for transmission of UDP packets. Instead, error checking and/or correction of UDP packets may be performed by the application. Because UDP packets have reduced transmission overhead from lower error checking standards, UDP packets may be preferred for time-sensitive applications where dropping packets is considered preferable to waiting for delayed packets. Allowing UDP packets to be transmitted according to the fast transmission method 200 of FIG. 2 may increase the bandwidth available at the network interface and improve performance of applications communicating through the network interface.

According to another embodiment, the application may be executing on a hypervisor-based system. For example, the application may be executing in an operating system hosted in an emulated environment. Other applications may be executing in other operating systems hosted in different emulated environments on the same physical hardware of the hypervisor-based system. An intermediate application, such as CPCommOS, may provide the application with communications to the network interface and may be hosted within the emulated environment. When the method 200 is executed by the intermediate application, the intermediate application may queue the second data packet for handling by the network interface at block 214. The completion code may be returned at block 214 to the application by assuming the queuing will be successful based on the determination that the second data packet is similar to the first data packet.

Determining whether the second data packet is similar to the first data packet at block 212 may be performed with a send state table. When the application requests to send data, the network interface and/or intermediate application may initially perform a slow transmission method to establish that the parameters of the send request are functional. After a send request is successful for a particular application activity, details for the send request may be entered into a send state table. For example, the send state table may store information such as an application identifier, an activity identifier, a local address, a local port, a remote address, and/or a remote port. When the data packets for transmission are UDP packets, the local address and the remote address may be internet protocol (IP) addresses. Any future data packet send requests similar to an entry in the send state table may be transmitted with the fast transmission method of block 214. According to one embodiment, the second data packet may be determined to be similar to the first data packet at block 212 when one or more of the application identifier, the activity identifier, the local address, the local port, the remote address, and/or the remote port are identical. In some embodiments, an entire 6-tuple of the application identifier, the activity identifier, the local address, the local port, the remote address, and the remote port are identical for the second data packet to be determined to be similar to the first data packet.

The send state table may store other information in addition to information about the data packets. For example, the send state table may store a connection identifier for a data packet, a timestamp that is updated each time the entry in the send state table is matched to a new data packet, a counter that tracks the number of fast sends since the last successful slow send, and a send state for future data packets similar to the data packet entered in the send state table. For example, an entry in the send state table may identify a packet as SLOW_NEXT, SLOW_IN_PROGRESS, SLOW_DETACHING, or FAST_NEXT.

FIG. 3 is a table illustrating a send state table according to one embodiment of the disclosure. A table 300 may include entries 302, 304, 306, and 308. The entries may include a local address, a local port, a remote address, and a remote port of a particular connection that previously was part of a send request from an application. The table 300 may include additional columns (not shown) to include other information discussed above, such as a date/time stamp, a counter, and/or other identifier values.

A status column indicates how additional data packets similar to the entries 302, 304, 306, and 308 are handled. For example, the entry 302 may be marked with the status "SLOW_NEXT" indicating that if a new send request is similar to the entry 302, the data packet of the new send request should be transmitted through a slow transmission method. In another example, the entry 304 may be marked with the status "SLOW_IN_PROGRESS" indicating an application associated with the send state table is waiting for a slow transmission to complete. In yet another example, the entry 306 may be marked with the status "SLOW_DETACHING" indicating an application that entered the entry 306 in the send state table is detaching from the network interface, but waiting for a completion notice from a slow send. When a new data packet is similar to the entry 306, the new data packet may be transmitted through a slow transmission method. In a further example, the entry 308 may be marked with the status "FAST_NEXT" indicating a packet similar to the entry 308 was previously-vetted by a slow transmission method. When a new data packet is similar to the entry 308, the new data packet may be transmitted through a fast transmission method. If the status for a send state table entry is "SLOW_NEXT" or "FAST_NEXT," then the application may be ready to begin another data transmission. If the status for a send state table entry is "SLOW_IN_PROGRESS" or "SLOW_DETACHING," then the application associated with the send state table may be unable to send additional packets until a completion event is received for the data packet currently being transmitted.

One or more send state tables, such as that of FIG. 3, may be stored by an application or a network interface for determining a method of transmitting data provided in a send request. According to one embodiment, an intermediate application, such as CPCommOS, may maintain a hash table having combinations of application identifiers, activity identifiers, and local and remote address and port combinations for tracking successes, completions, and status of various connections. The hash table may be maintained through a timeout mechanism to release older and/or unused send state tables and clear their hash entries. When an entry in the hash table is removed, future requests to send data similar to the removed hash table entry may restart the process, such as the method 200 of FIG. 2, with an initial slow send. The timeout value may be predetermined and set by an administrator of a computer system hosting the application and the network interface.

According to one embodiment, the send state table may also include forward and backward links to other send state tables that are chained because of hashing collisions. A second statically-allocated connect table may be used to convert from a connection identifier to a send state table pointer to allow the send state table pointer values to be verified as valid.

A third, statically-allocated hash table may be defined to allow locating an existing send state table based on data about the local and remote address and port combinations. According to one embodiment, send state tables may be identified by a 6-tuple comprising a local address, a local port, a remote address, a remote port, an application identifier, and an application activity identifier.

Figure 4:
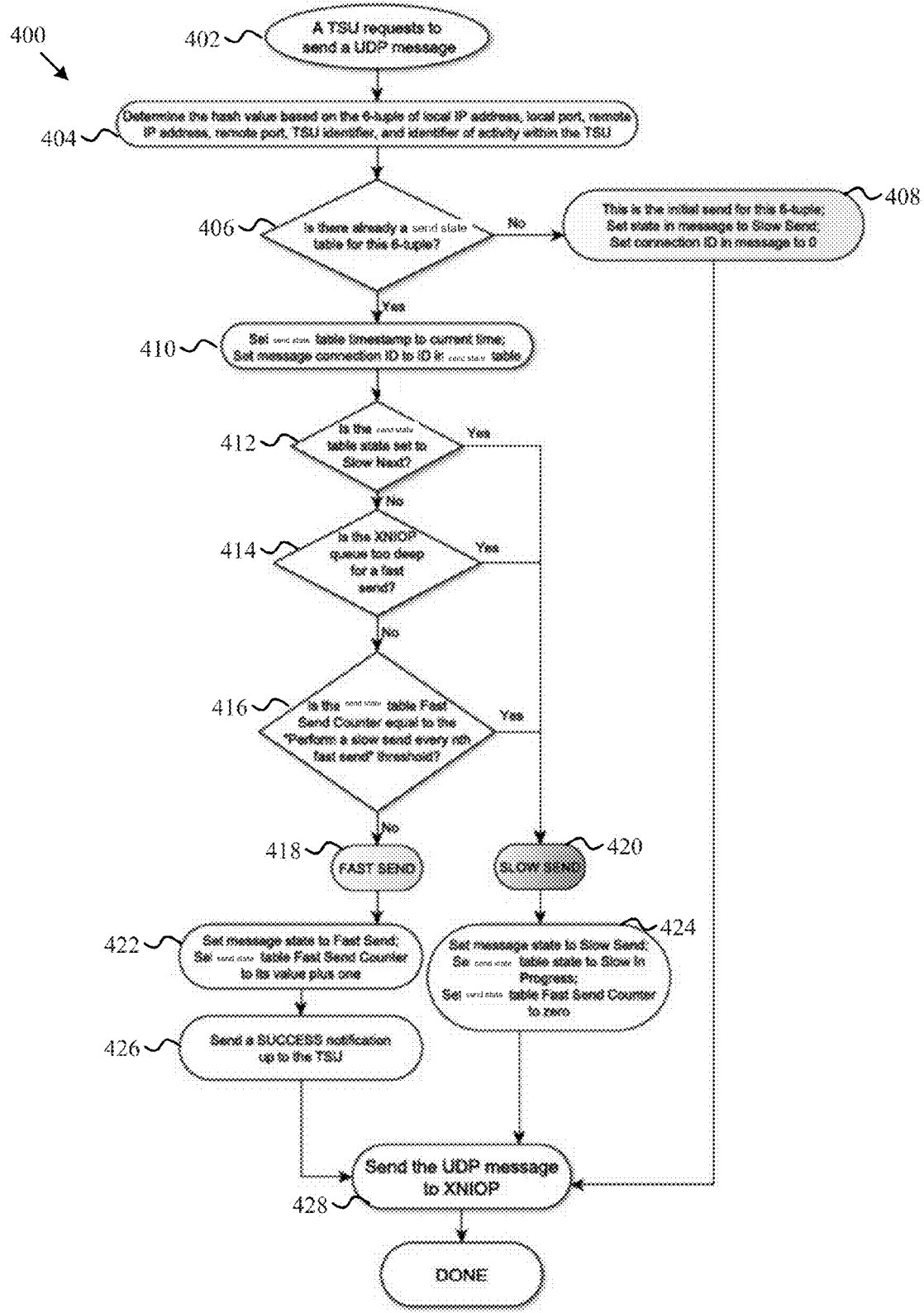
FIG. 4 is a flow chart illustrating an exemplary method for an application to transmit data through a network interface according to one embodiment of the disclosure.

FIG. 4 is a flow chart illustrating an exemplary method for an application to transmit data through a network interface according to one embodiment of the disclosure. A method 400 begins at block 402 with an application, such as a TSU, requesting to send a data packet, such as a UDP message. At block 404, the hash value for the data packet is calculated based on the 6-tuple of a local address, local port, remote address, remote port, application identifier, and activity identifier. At block 406, it is determined whether an entry in the send state table already exists for the 6-tuple. If not, the method 400 proceeds to block 408 to set the transmission method to a slow send method and set a connection identification for the data packet to zero. Afterwards, the method 400 transmits the message to a network interface at block 428 to queue the packet for transmission.

If the send state table already includes an entry for the 6-tuple at block 406, then the method 400 proceeds to block 410 to set a timestamp entry in the send state table for the 6-tuple to the current time and set a connection identifier for the message to the identifier of the 6-tuple in the send state table. At block 412, it is determined whether a state for the 6-tuple in the send state table is set to transmit according to the slow method for the next matching packet. If so, a slow send method is executed at block 420. At block 424, the state of the data packet is set to slow send, the entry in the send state table for the 6-tuple is set to slow send in progress, and a send state table fast send counter is set to zero. The data packet is then transmitted to the network interface at block 428.

If the send state table entry for the 6-tuple is not set to slow next at block 412, then it is determined at block 414 whether the queue at the network interface is too long to perform a fast send. If so, then the method 400 continues to block 420. If not, it is determined at block 416 whether the send state table fast send counter is equal to an integer interval of a threshold for performing a slow send for throttling a particular connection in the send state table. If so, the method 400 proceeds to block 420 to perform a slow send. If not, the method 400 continues to block 418 to perform a fast send.

When performing a fast send, the method 400 begins at block 422 with setting a state of the data packet to fast send and incrementing a fast send counter for the matching entry of the send state table. At block 426, a success code is transmitted to the application, which allows the application to resume execution. At block 428, the data packet is sent to the network interface.

Figure 5:
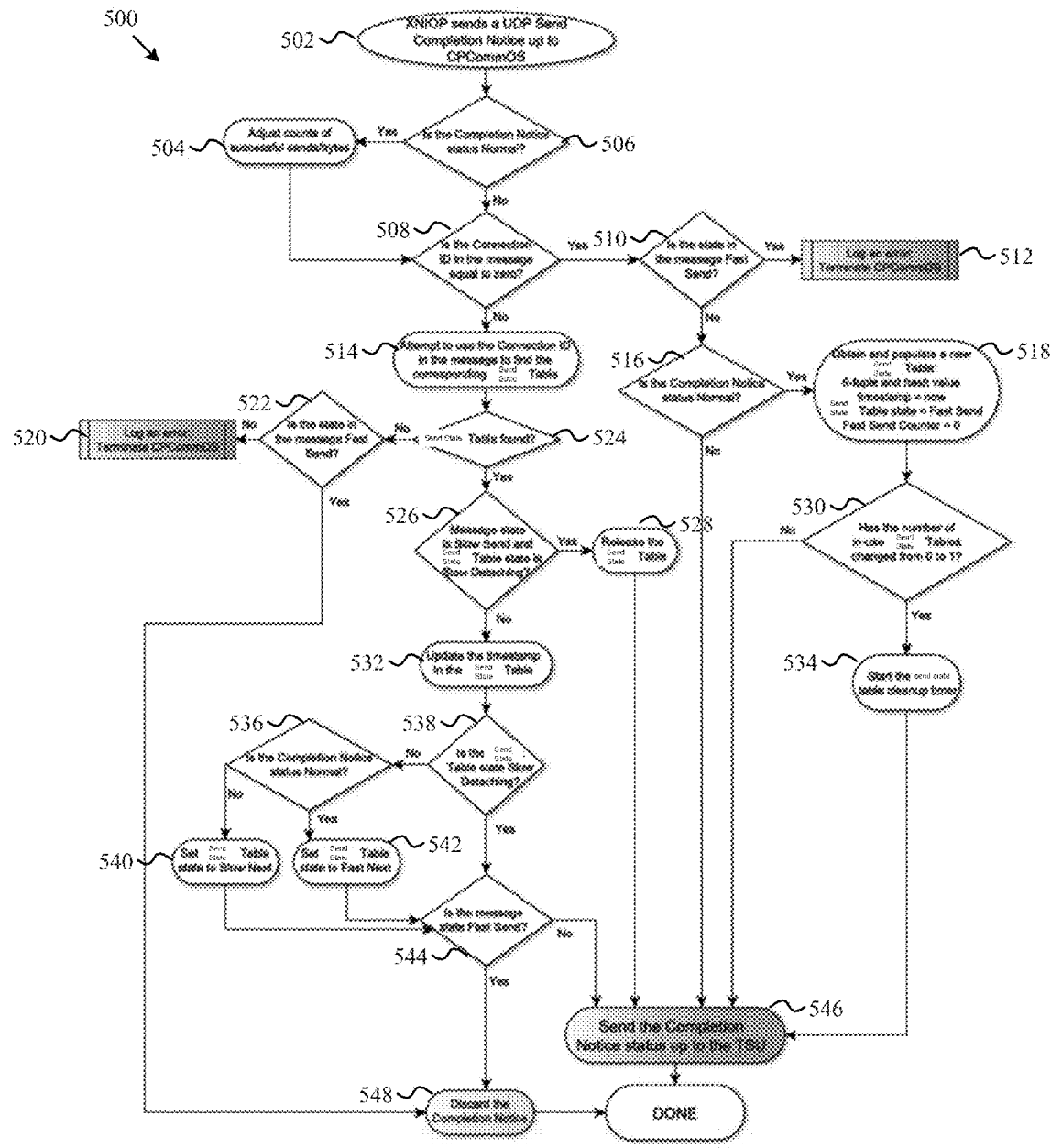
FIG. 5 is a flow chart illustrating an exemplary method for a network interface to send a completion notice to an application according to one embodiment of the disclosure.

A network interface, such as XNIOP, may communicate with an operating system within an emulated environment, such as CPCommOS, where the application that transmits data packets to the network interface is executing. FIG. 5 is a flow chart illustrating an exemplary method for a network interface to send a completion notice to an application according to one embodiment of the disclosure. A method 500 begins at block 502 with a network interface sending a completion code to the application. The completion code may be transmitted to an agent in an emulated environment within which the application is running, which relays the code to the application. At block 506, it is determined whether the completion notice status is normal. If so, the method 500 increments system counters at block 504, such as a send counter and/or a byte counter and continues to block 508. If not, the method 500 does not increment counters and continues to block 508.

At block 508, it is determined whether the connection identifier in the message is equal to zero. If so, the method 500 continues to block 510 to determine if the state in the message is for a fast send. If so, the method 500 logs an error and terminates the application, or an emulated interface executing the application, at block 512. If not in a fast send state at block 510, then the method 500 continues to block 516 to determine whether the completion status is normal. If so, then a new send state table is created at block 518 with details regarding the packet transmitted successfully according to the completion notice received at block 502. For example, the send state table may be created with data such as addresses and/or ports of sending and/or receiving computers. At block 530, it is determined whether the send state table created at block 518 was the first send state table. If so, the send state table cleanup timer is started at block 534 and the method 500 continues to block 546. When the send state table cleanup time reaches a certain level, the cleanup timer trigger may execute the method of FIG. 7, described below. If not the first send state table, the method 500 continues to block 546. At block 546, the completion notice status is transmitted to the application. If the completion notice status is not normal at block 516, then the method continues to block 546 to send the completion notice to the application.

If the connection identifier in the message is not equal to zero at block 508, then the method 500 continues to block 514 to attempt to use the connection identifier to find a corresponding send state table. If a send state table is not found at block 524, then it is determined at block 522 whether the state in the message is a fast send. If not, then an error is logged and the emulated interface is terminated at block 520. If so, then the completion notice is discarded at block 548.

If a send state table was found at block 524, then it is determined at block 526 whether a message state is slow send and a state of the send state table is slow detaching. If so, then the send state table is released at block 528 and the completion notice is transmitted to the application at block 546. If not, the timestamp of the send state table is updated to a current timestamp at block 532 and it is determined at block 538 whether the send state table state is slow detaching. If so, it is determined at block 544 whether the message state is fast send. If not, the completion notice is sent to the application at block 546. If so, the completion notice is discarded at block 548.

If the send state table state is not slow detaching at block 538, then it is determined at block 536 whether the completion notice status is normal. If not, the send state table state is set to slow next at block 540. If so, the send state table state is set to fast next at block 542. After setting the send state table state at block 540 or block 542, then it is determined at block 544 whether the message state is fast send. If so, the completion notice is discarded at block 548. If not, the completion notice is transmitted to the application at block 546.

Figure 6:
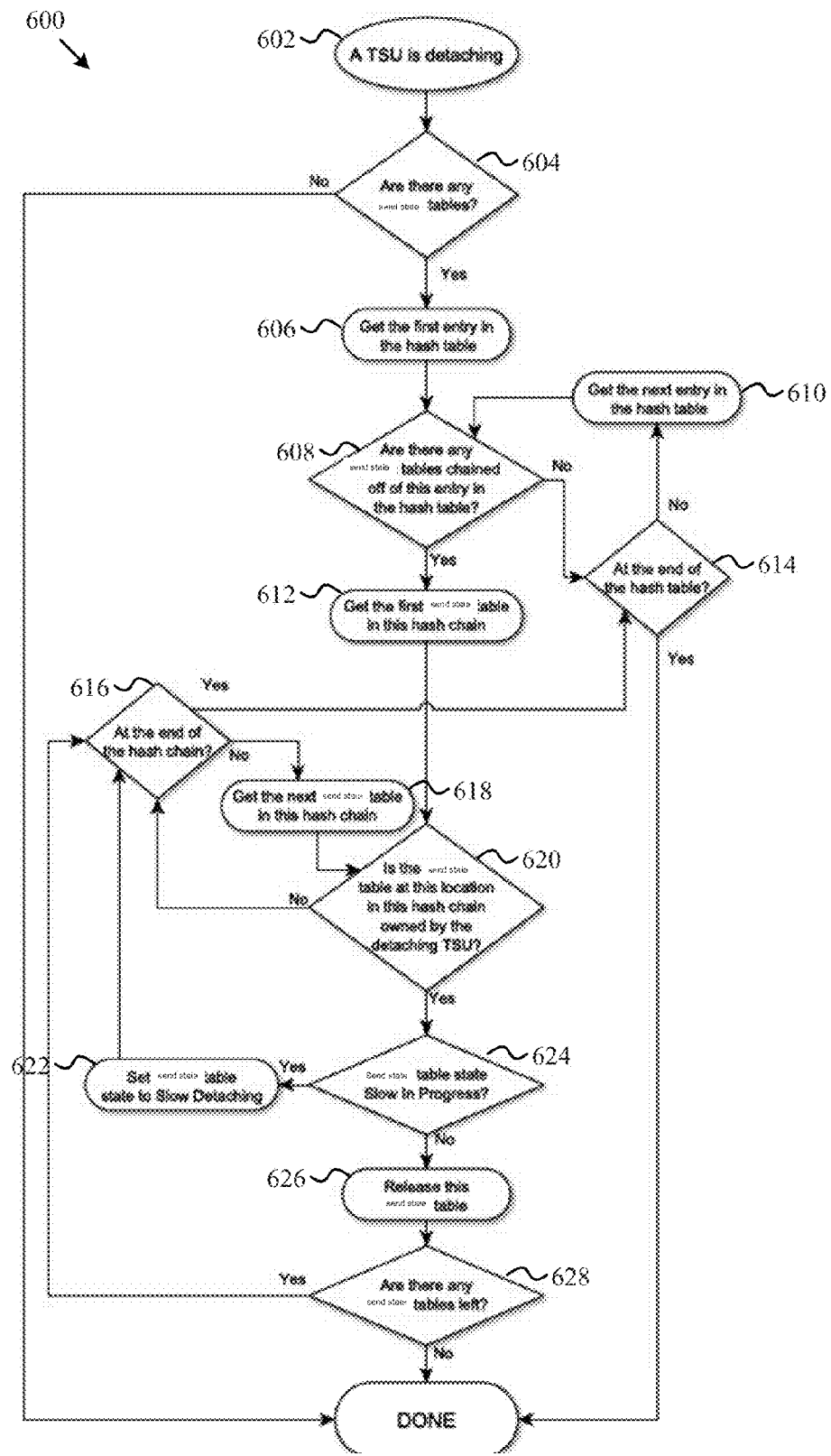
FIG. 6 is a flow chart illustrating a method for handling send state tables when an application detaches from execution according to one embodiment of the disclosure.

FIG. 6 is a flow chart illustrating a method for handling send state tables when an application detaches from execution according to one embodiment of the disclosure. A method 600 begins at block 602 with the application detaching. At block 604 it is determined whether there are any send state tables. If none, then the method 600 terminates. If so, then the method 600 continues to block 606 to get the first entry in the hash table and to block 608 to determine if there are any send state tables chained off this entry in the hash table. If no chained tables exist, then it is determined at block 614 whether the end of the hash table is reached. If so, then the method 600 terminates. If not, the next entry in the hash table is retrieved at block 610 and the method 600 returns to block 608.

If send state tables are determined to be chained at block 608, then the first send state table in the hash chain is obtained at block 612 and it is determined at block 620 whether the send state table is owned by the detaching application of block 602. If not, it is determined at block 616 whether the send state table is the end of the hash chain. If so the method continues to block 614. If not, the method gets the next send state table in the hash's chain at block 618 and again determines at block 620 if the send state table is owned by the detaching application.

If the send state table is owned by the detaching application at block 620, then it is determined at block 624 whether the send state table state is slow in progress. If so, the send state table state is set to slow detaching at block 622, and the method 600 continues to block 616. If not, then the send state table is released at block 626 and it is determined at block 628 if there are any remaining send state tables. If so, then the method 600 continues to block 616 to examine the additional send state tables. If not, then the method 600 terminates.

Figure 7:
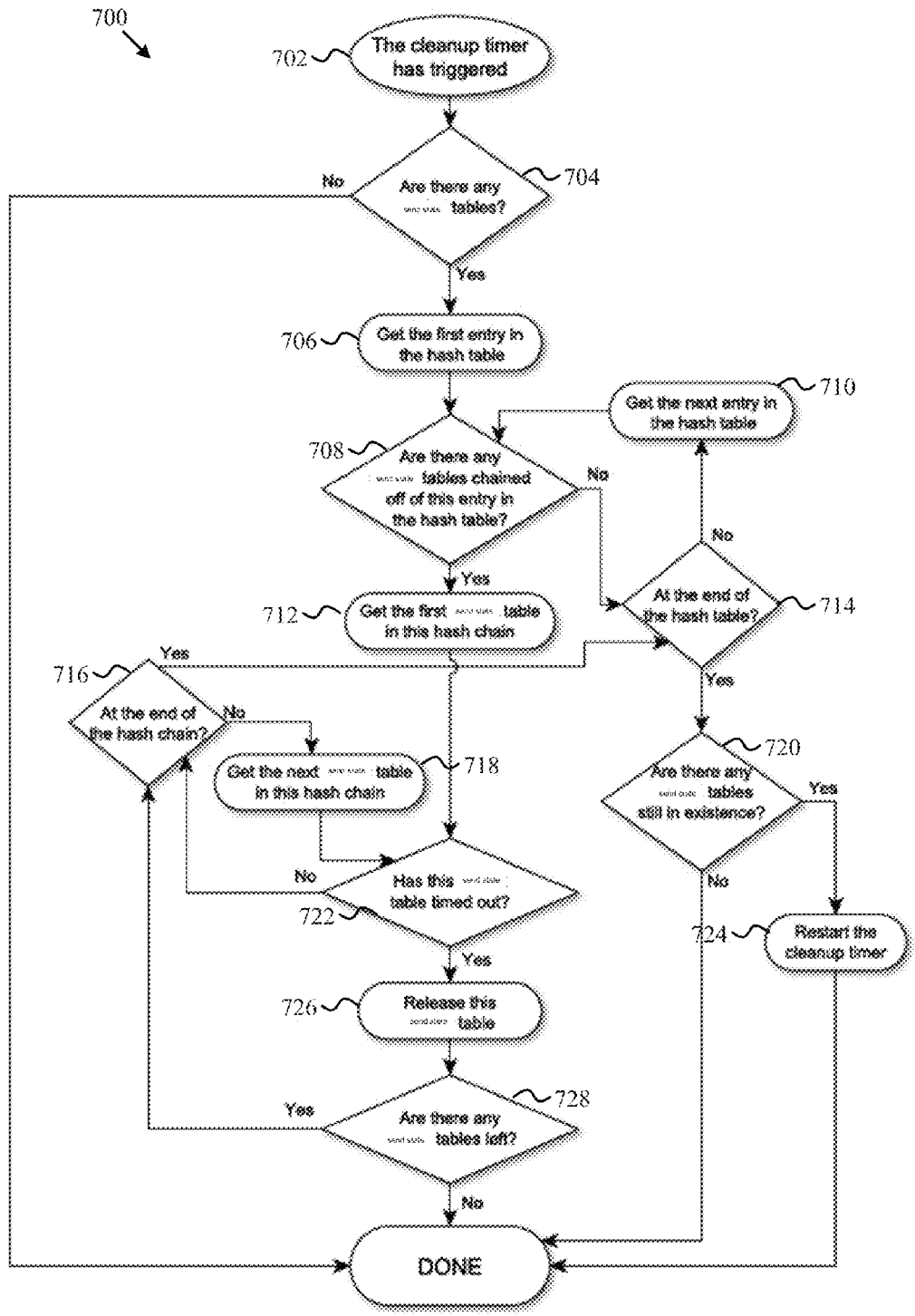
FIG. 7 is a flow chart illustrating a method for cleaning send state tables according to one embodiment of the disclosure.

FIG. 7 is a flow chart illustrating a method for cleaning send state tables according to one embodiment of the disclosure. A method 700 begins at block 702 when the cleanup timer has triggered. At block 704, it is determined whether there are any send state tables. If not, the method 700 terminates. If so, then the first entry in the hash table is obtained at block 706. At block 708, it is determined whether there are any send state tables chained off the entry obtained at block 706. If not, it is determined whether the end of the hash table is reached at block 714. If not, then the next entry in the hash table is obtained at block 710, and the method 700 repeats block 708. If so, then it is determined at block 720 whether any send state tables still exist. If not, then the method 700 terminates. If so, then the cleanup timer is restarted at block 724 and the method 700 terminates.

If there are further send state tables chained from the hash table entry at block 708, then the first send state table in the hash chain is obtained at block 712. At block 722, it is determined whether the send state table has timed out. If so, then the send state table is released at block 726 and it is determined at block 728 whether there are any send state tables left. If none, then the method 700 terminates. If so, then it is determined whether the end of the hash chain was reached at block 716. If so, then the method 700 returns to block 714. If not, then the method obtains the next send state table in the hash chain at block 718 and repeats block 722.

Throttling may be applied to data packets received for transmission through a network interface. In particular, throttling may be performed to limit the number of fast sends performed by an application or a group of applications. For example, if one application in an emulated machine sends large amounts of data to a few recipients, the data packets may be marked for fast sends that reduce the throughput of another application in the emulated machine that sends data to many recipients. Throttling may be performed to avoid overfilling the network output queue (NOQ) in the emulated machine, such as a queue in CPCommOS that transmits packets to XNIOP. Throttling may also be performed to improve fairness, such that one application in an emulated machine does not flood the network output queue at the expense of other applications in the emulated machine. Throttling may further be performed to send status information to the application if there is a problem with the transmission of data packets.

According to one embodiment, if the NOQ exceeds a certain depth, such as when there are more than a predetermined number of items in the queue, then fast sends may be suspended. Fast sends for certain protocols may be suspended, while other protocols may continue to operate normally. For example, UDP sends may be suspended, but TCP sends may continue.

In another embodiment, if a non-successful status is part of a completion notice to the application, fast sends for similar transmissions may be suspended. For example, fast sends for a particular activity by an application on a particular local and remote address and port combination may be suspended. When the fast send is suspended, a slow send may be used for the next transmission from that application, which may result in the return of success/error information to that application.

In a further embodiment, for a particular application, activity, and/or local and remote address and port combination, a slow send may be performed every certain number of sends. For example, every fifth transmission from an application matching a hash value for a 6-tuple may be sent with a slow send method. In another example, every seventh transmission from an application to a particular recipient may be sent with a slow send method.

Figure 8:
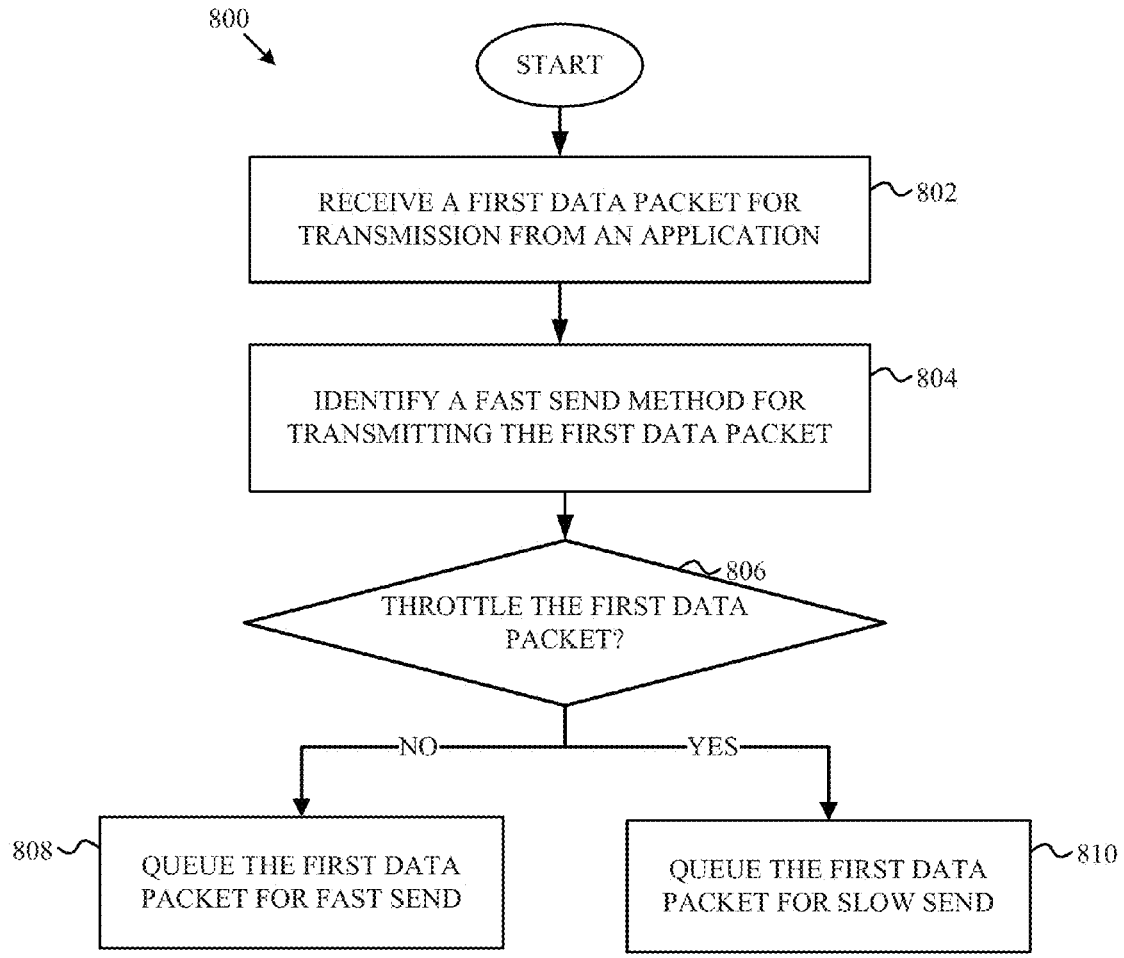
FIG. 8 is a flow chart illustrating a method for throttling connection requests according to one embodiment of the disclosure.

FIG. 8 is a flow chart illustrating a method for throttling connection requests according to one embodiment of the disclosure. A method 800 begins at block 802 with receiving a first data packet for transmission from an application. At block 804, the fast send method is identified for transmitting the first data packet. The fast send method may be identified for the first data packet based on send state tables described above. At block 806, it is determined whether to throttle transmission of the first data packet. Throttling may be determined based on an algorithm, such as by counting data packets and throttling a certain number of the data packets queued for transmission. If the first data packet is throttled, the first data packet is queued for transmission by a slow send method at block 810, regardless of the instruction to fast send the data packet at block 804. If the first data packet is not throttled, the first data packet is queued for transmission by a fast send method at block 808.

Figure 9:
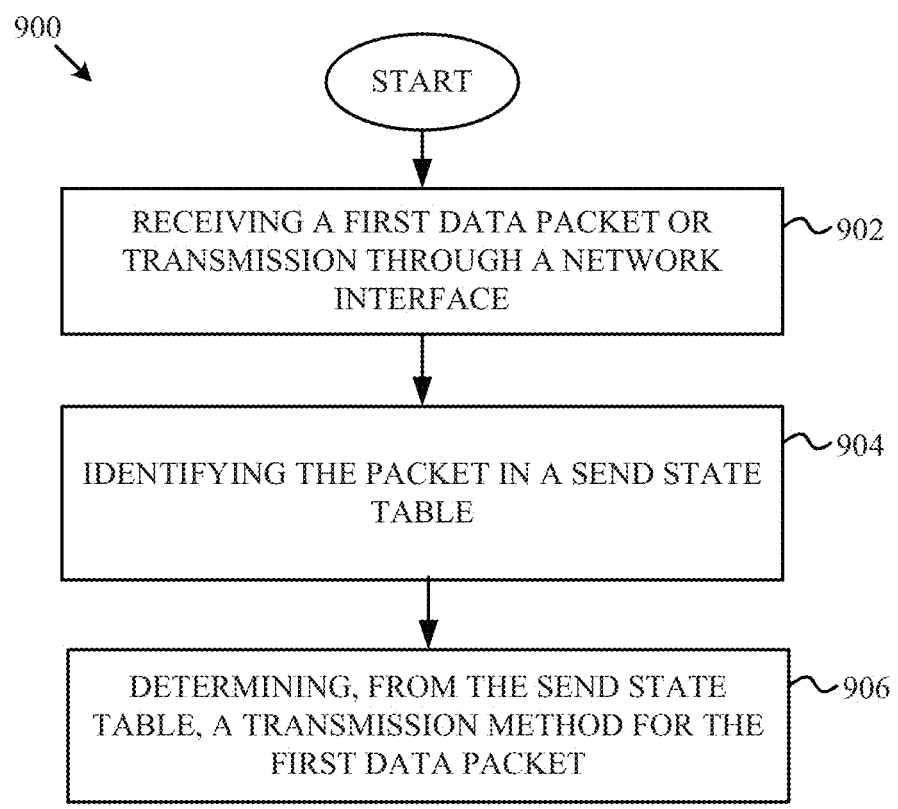
FIG. 9 is a flow chart illustrating a method for handling packets received from an application executing on a virtual machine according to one embodiment of the disclosure.

FIG. 9 is a flow chart illustrating a method for handling packets received from an application executing on a virtual machine according to one embodiment of the disclosure. A method 900 begins at block 902 with receiving a first data packet for transmission through a network interface. The first data packet may be received from an application executing in an emulated environment. At block 904, the packet is identified in a send state table. At block 906, a method for sending the first data packet is determined based, in part, on the send state table of block 904. For example, a similar packet may have been successfully transmitted previously according to a slow method and the packet information logged in the send state table. When the first data packet has similar characteristics as a successfully transmitted previous-packet, a fast method of transmission for the first data packet may be determined at block 906.

Figure 10:
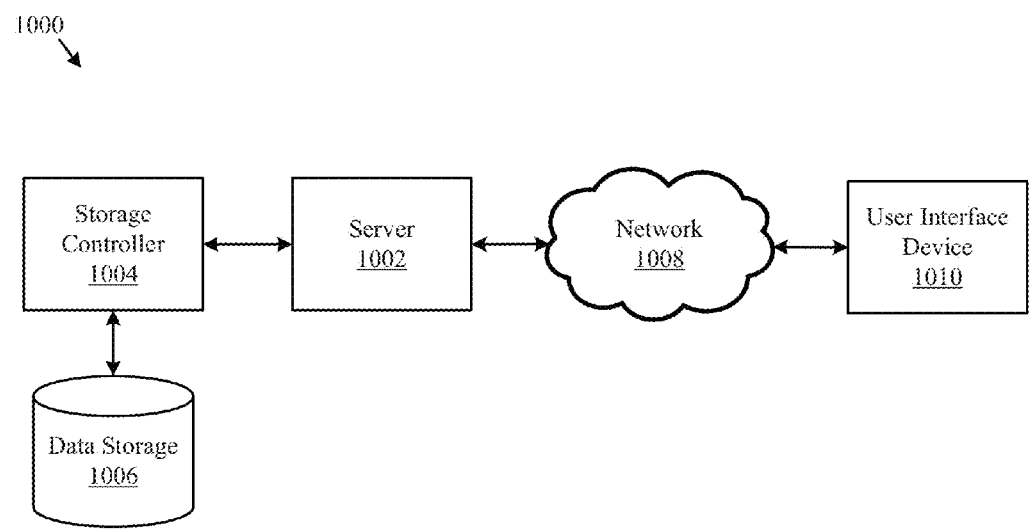
FIG. 10 is a block diagram illustrating a computer network according to one embodiment of the disclosure.

FIG. 10 illustrates one embodiment of a system 1000 for an information system, including a system for processing data packets. The system 1000 may include a server 1002, a data storage device 1006, a network 1008, and a user interface device 1010. The server 1002 may be a dedicated server or one server in a cloud computing system. The server 1002 may also be a hypervisor-based system executing one or more guest partitions. Each guest partition may transmit data packets to and from the network 1008, the user interface device 1010 and the data storage device 1006 according to a fast send or slow send method. In a further embodiment, the system 1000 may include a storage controller 1004, or storage server configured to manage data communications between the data storage device 1006 and the server 1002 or other components in communication with the network 1008. In an alternative embodiment, the storage controller 1004 may be coupled to the network 1008.

In one embodiment, the user interface device 1010 is referred to broadly and is intended to encompass a suitable processor-based device such as a desktop computer, a laptop computer, a personal digital assistant (PDA) or tablet computer, a smartphone or other mobile communication device having access to the network 1008. When the device 1010 is a mobile device, sensors (not shown), such as a camera or accelerometer, may be embedded in the device 1010. When the device 1010 is a desktop computer the sensors may be embedded in an attachment (not shown) to the device 1010. In a further embodiment, the user interface device 1010 may access the Internet or other wide area or local area network to access a web application or web service hosted by the server 1002 and provide a user interface for enabling a user to enter or receive information. For example, an administrator may examine send state tables or configure specific throttling rules.

The network 1008 may facilitate communications of data, such as deployment packages, between the server 1002 and the user interface device 1010. The network 1008 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 1010 accesses the server 1002 through an intermediate server (not shown). For example, in a cloud application the user interface device 1010 may access an application server. The application server may fulfill requests from the user interface device 1010 by accessing a database management system (DBMS). In this embodiment, the user interface device 1010 may be a computer or phone executing a Java application making requests to a JBOSS server executing on a Linux server, which fulfills the requests by accessing a relational database management system (RDMS) on a mainframe server.

Figure 11:
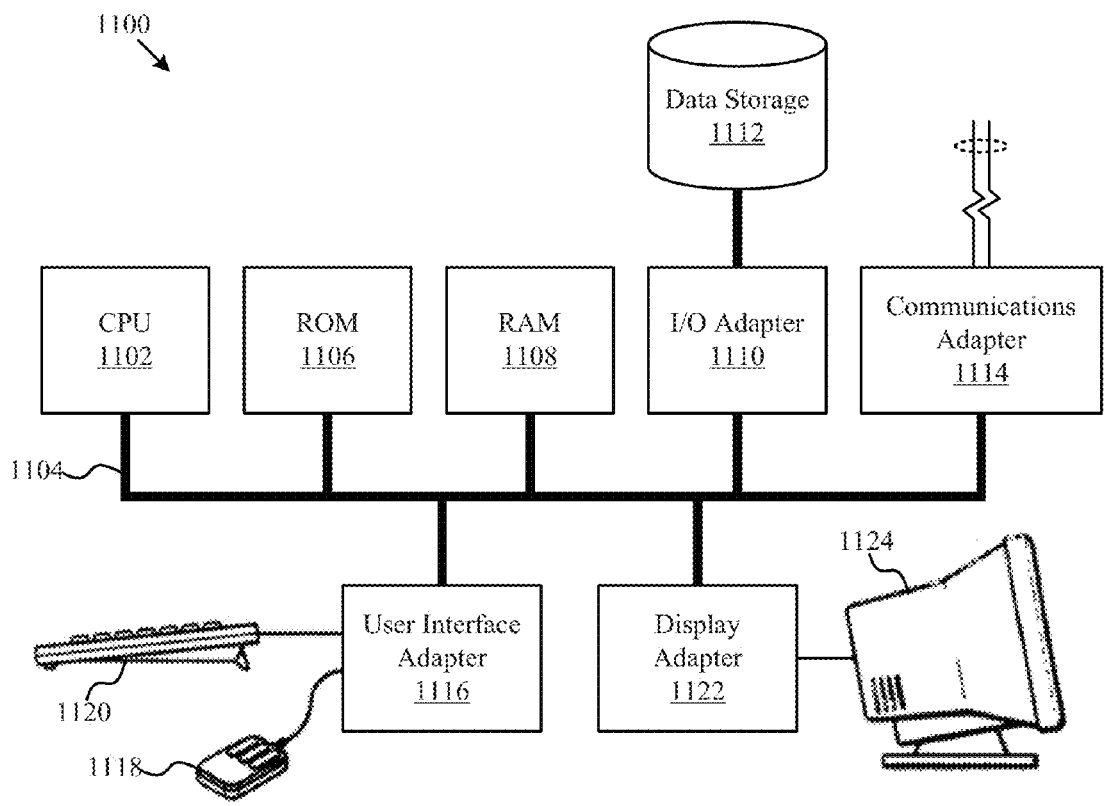
FIG. 11 is a block diagram illustrating a computer system according to one embodiment of the disclosure.

FIG. 11 illustrates a computer system 1100 adapted according to certain embodiments of the server 1002 and/or the user interface device 1010. The central processing unit ("CPU") 1102 is coupled to the system bus 1104. The CPU 1102 may be a general purpose CPU or microprocessor, graphics processing unit ("GPU"), and/or microcontroller. The present embodiments are not restricted by the architecture of the CPU 1102 so long as the CPU 1102, whether directly or indirectly, supports the operations as described herein. The CPU 1102 may execute the various logical instructions according to the present embodiments.

The computer system 1100 also may include random access memory (RAM) 1108, which may be synchronous RAM (SRAM), dynamic RAM (DRAM), synchronous dynamic RAM (SDRAM), or the like. The computer system 1100 may utilize RAM 1108 to store the various data structures used by a software application. The computer system 1100 may also include read only memory (ROM) 1106 which may be PROM, EPROM, EEPROM, optical storage, or the like. The ROM may store configuration information for booting the computer system 1100. The RAM 1108 and the ROM 1106 hold user and system data, and both the RAM 1108 and the ROM 1106 may be randomly accessed.

The computer system 1100 may also include an input/output (I/O) adapter 1110, a communications adapter 1114, a user interface adapter 1116, and a display adapter 1122. The I/O adapter 1110 and/or the user interface adapter 1116 may, in certain embodiments, enable a user to interact with the computer system 1100. In a further embodiment, the display adapter 1122 may display a graphical user interface (GUI) associated with a software or web-based application on a display device 1124, such as a monitor or touch screen.

The I/O adapter 1110 may couple one or more storage devices 1112, such as one or more of a hard drive, a solid state storage device, a flash drive, a compact disc (CD) drive, a floppy disk drive, and a tape drive, to the computer system 1100. According to one embodiment, the data storage 1112 may be a separate server coupled to the computer system 1100 through a network connection to the I/O adapter 1110. The communications adapter 1114 may be adapted to couple the computer system 1100 to the network 1008, which may be one or more of a LAN, WAN, and/or the Internet. The communications adapter 1114 may also be adapted to couple the computer system 1100 to other networks such as a global positioning system (GPS) or a Bluetooth network. The user interface adapter 1116 couples user input devices, such as a keyboard 1120, a pointing device 1118, and/or a touch screen (not shown) to the computer system 1100. The keyboard 1120 may be an on-screen keyboard displayed on a touch panel. Additional devices (not shown) such as a camera, microphone, video camera, accelerometer, compass, and or gyroscope may be coupled to the user interface adapter 1116. The display adapter 1122 may be driven by the CPU 1102 to control the display on the display device 1124. Any of the devices 1102-1122 may be physical and/or logical.

The applications of the present disclosure are not limited to the architecture of computer system 1100. Rather the computer system 1100 is provided as an example of one type of computing device that may be adapted to perform the functions of the server 1002 and/or the user interface device 1010. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 1100 may be virtualized for access by multiple users and/or applications.

Figure 12A:
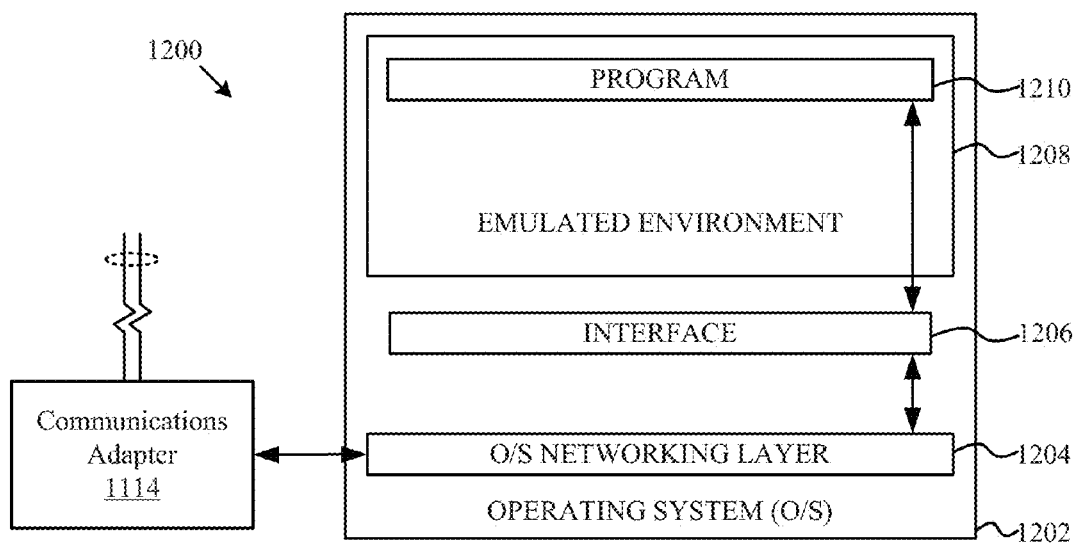
FIG. 12A is a block diagram illustrating a server hosting an emulated software environment for virtualization according to one embodiment of the disclosure.

FIG. 12A is a block diagram illustrating a server hosting an emulated software environment for virtualization according to one embodiment of the disclosure. An operating system 1202 executing on a server includes drivers for accessing hardware components, such as a networking layer 1204 for accessing the communications adapter 1114. The operating system 1202 may be, for example, Linux. An emulated environment 1208 in the operating system 1202 executes a program 1210, such as CPCommOS. The program 1210 accesses the networking layer 1204 of the operating system 1202 through a non-emulated interface 1206, such as XNIOP. The non-emulated interface 1206 translates requests from the program 1210 executing in the emulated environment 1208 for the networking layer 1204 of the operating system 1202.

Figure 12B:
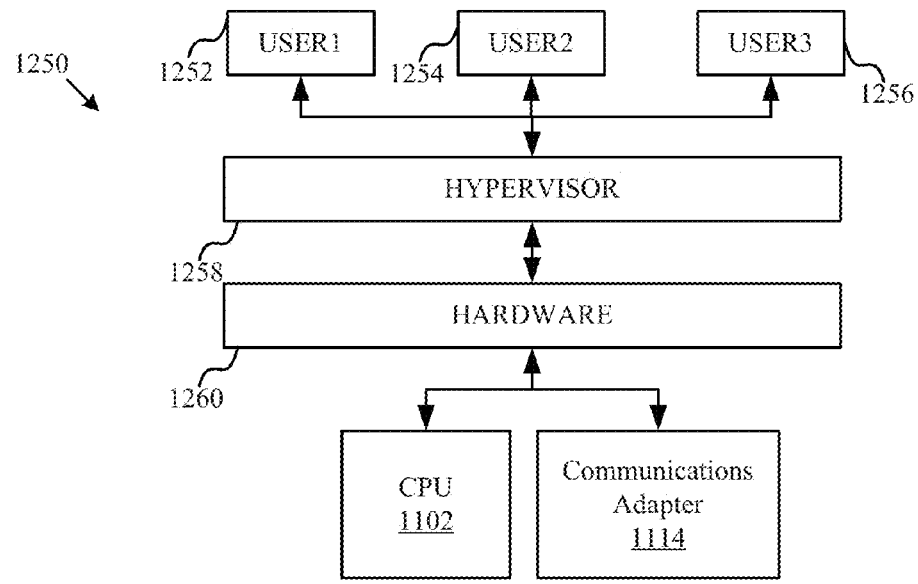
FIG. 12B is a block diagram illustrating a server hosting an emulated hardware environment according to one embodiment of the disclosure.

In another example, hardware in a computer system may be virtualized through a hypervisor. FIG. 12B is a block diagram illustrating a server hosting an emulated hardware environment according to one embodiment of the disclosure. Users 1252, 1254, 1256 may access the hardware 1260 through a hypervisor 1258. The hypervisor 1258 may be integrated with the hardware 1260 to provide virtualization of the hardware 1260 without an operating system, such as in the configuration illustrated in FIG. 12A. The hypervisor 1258 may provide access to the hardware 1260, including the CPU 1102 and the communications adaptor 1114.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
receiving, from an application, a first data packet for transmission;
identifying a fast send method for transmitting the first data packet based on a table by matching information regarding the first data packet to an entry in the table, wherein the entry comprises an instruction to transmit the first data packet using the fast send method;
determining whether to throttle the first data packet; and
transmitting, if the first data packet is throttled, the first data packet with a slow send method.

2. The method of claim 1, further comprising transmitting, if the first data packet is not throttled, the first data packet with a fast send method.

3. The method of claim 2, in which the step of identifying the fast send method for transmitting the first data packet comprises determining a similar packet to the first data packet was previously transmitted successfully.

4. The method of claim 2, in which the step of determining whether to throttle the first data packet comprises determining whether a certain number of data packets were transmitted with the fast send method prior to the first data packet.

5. The method of claim 2, in which the step of determining whether to throttle the first data packet comprises determining whether a queue of data packets for transmission exceeds a predetermined size.

6. The method of claim 2, in which the step of determining whether to throttle the first data packet comprises determining whether the application has exceeded a predetermined number of packets transmitted with the fast send method over a predetermined period of time.

7. The method of claim 1, in which receiving the first data packet from the application comprises receiving the first data packet from the application executing in an emulated environment.

8. The method of claim 1, in which the step of transmitting the first data packet comprises transmitting a user datagram protocol (UDP) packet.

9. A computer program product, comprising:
a non-transitory computer readable medium comprising:
code to receive, from an application, a first data packet for transmission;
code to identify a fast send method for transmitting the first data packet based on a table by matching information regarding the first data packet to an entry in the table, wherein the entry comprises an instruction to transmit the first data packet using the fast send method;
code to determine whether to throttle the first data packet; and
code to transmit, if the first data packet is throttled, the first data packet with a slow send method.

10. The computer program product of claim 9, in which the medium further comprises code to transmitting, if the first data packet is not throttled, the first data packet with a fast send method.

11. The computer program product of claim 10, in which the medium further comprises code to determine a similar packet to the first data packet was previously transmitted successfully.

12. The computer program product of claim 10, in which the medium further comprises code to determine whether a certain number of data packets were transmitted with the fast send method prior to the first data packet.

13. The computer program product of claim 10, in which the medium further comprises code to determine whether a queue of data packets for transmission exceeds a predetermined size.

14. The computer program product of claim 10, in which the medium further comprises code to determine whether the application has exceeded a predetermined number of packets transmitted with the fast send method over a predetermined period of time.

15. The computer program product of claim 10, in which the medium further comprises code to transmit a user datagram protocol (UDP) packet.

16. An apparatus, comprising:
a memory;
a network interface; and
a processor coupled to the memory and to the network interface, in which the processor is configured:
to receive, from an application, a first data packet for transmission;

to identify a fast send method for transmitting the first data packet based on a table by matching information regarding the first data packet to an entry in the table, wherein the entry comprises an instruction to transmit the first data packet using the fast send method;
to determine whether to throttle the first data packet; and
to transmit, if the first data packet is throttled, the first data packet with a slow send method.

17. The apparatus of claim 16, in which the processor is further configured to transmitting, if the first data packet is not throttled, the first data packet with a fast send method.

18. The apparatus of claim 17, in which the processor is further configured to determine whether a certain number of data packets were transmitted with the fast send method prior to the first data packet.

19. The apparatus of claim 17, in which the processor is further configured to determine whether a queue of data packets for transmission exceeds a predetermined size.

20. The apparatus of claim 17, in which the processor is further configured to transmit a user datagram protocol (UDP) packet.

\* \* \* \* \*